United States Patent
Kim (10) Patent No.: US 7,327,402 B2
(45) Date of Patent: Feb. 5, 2008

(54) VIDEO DISPLAYER FACILITATING CHANNELS AND VIDEO/AUDIO INPUT SETTINGS

(75) Inventor: Tae-hwan Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 569 days.

(21) Appl. No.: 10/644,725

(22) Filed: Aug. 21, 2003

(65) Prior Publication Data

US 2004/0036810 A1 Feb. 26, 2004

(30) Foreign Application Priority Data

Aug. 21, 2002 (KR) ............................... 2002-49566

(51) Int. Cl.
*H04N 5/445* (2006.01)
(52) U.S. Cl. ................. 348/555; 348/552; 348/553; 348/725
(58) Field of Classification Search ........ 348/553–555, 348/552, 564, 731, 725, 706, 714, 734; *H04N 5/445*
See application file for complete search history.

(56) References Cited

U.S. PATENT DOCUMENTS

| | | | |
|---|---|---|---|
| 6,580,462 B2 * | 6/2003 | Inoue et al. | 348/460 |
| 6,943,845 B2 * | 9/2005 | Mizutome et al. | 348/555 |
| 7,009,659 B2 * | 3/2006 | Dew et al. | 348/553 |
| 2002/0021373 A1 * | 2/2002 | Shibamiya | 348/734 |

* cited by examiner

*Primary Examiner*—Trang U. Tran
(74) *Attorney, Agent, or Firm*—Sughrue Mion, PLLC (57) ABSTRACT

A video displayer that facilitates resetting of channel and external input settings includes a tuner configured to select a broadcast signal; an external signal input unit configured to receive an external signal; a signal processing unit configured to process one of the broadcast signal selected and external signal, and to reproduce video images on a display and audio output through a speaker; and a control unit configured to sequentially store setting data for setting environments of said tuner, said external signal input unit, and said signal processing unit according to an externally applied control signal, and to set the setting environment of at least one of said tuner, said external signal input unit, and said signal processing unit with one of previous setting data and subsequent setting data based on any one data set of the setting data in response to a state changing signal applied from an external source.

18 Claims, 5 Drawing Sheets

VIDEO DISPLAYER FACILITATING CHANNELS AND VIDEO/AUDIO INPUT SETTINGS

BACKGROUND OF THE INVENTION

The present Application claims priority from Korean Patent Application 2002-0049566, filed in the Republic of Korea on Aug. 21, 2002, which Korean application is incorporated in full herein by reference.

1. Field of the Invention

The present invention relates to a video displayer, and more particularly to a video displayer facilitating video and audio settings for channels and external inputs of the video displayer such as inputs applied to the video displayer from a video, DVD, and a settop box.

2. Description of the Prior Art

With the developments of video and audio reproducing technologies, a video displayer such as a TV set can implement new functions such as the surround function, Dolby® function, multi-language support, external input support, caption broadcast support, and so on, in addition to basic functions such as the reproductions of general images and sounds. In order to apply such functions to a video displayer, more function keys must be provided on a remote control unit or more menus, for example, OSD (on-screen display) menu, must be displayed on a video displayer. However, there exists a limit in increasing the size of the remote control unit or decreasing the sizes of the keys provided on the remote control unit, causing difficulties in increasing the number of keys in proportion to the addition of the functions described above. Accordingly, the video displayer requires the number of OSD menus which can be displayed on the screen to be increased, causing a lot of users' inconvenience when users switch video and audio settings.

In addition, with the emergence of cable and satellite broadcasts, a viewer may watch programs of diverse types, requiring separate settings for the different types of programs. For example, separate color adjustments are needed for a channel on which movies are primarily broadcast, depending on a viewer's preference, and, for a music channel, the Dolby® function (having less noise) or the surround function (giving realism as in a theater) may be needed, and so on. These functions require different settings from those for watching general soap operas or news, and a viewer must adjust the settings for the existing video displayers every time he or she changes channels. For example, as a viewer first watches a movie on a movie channel, then watches news for a while on a different channel, and lastly watches again a movie on the movie channel, the viewer must set video and audio settings again which are suitable for the movie channel. Similarly, even when a viewer is enjoying images and sounds from an external input source such as a video, a DVD, or a settop box, the viewer has the problem that he or she needs to reset video and audio settings for images and sounds due to the above-discussed problem.

SUMMARY OF THE INVENTION

The present invention has been devised to solve the above problems, so it is an object of the present invention to provide a video displayer capable of readily recovering channels, external inputs, and video and audio settings therefor, which have been set by viewers.

It is another object of the present invention to provide a method facilitating channel and external input settings for a video displayer.

It is yet another object of the present invention to provide a remote control unit for a video displayer capable of facilitating channel, external input, and video and audio settings therefor.

The above objects are achieved, according to the present invention, by a tuner for selecting a broadcast signal; an external signal input unit for inputting an external signal; a signal processing unit for processing a broadcast signal or an external signal selected by the tuner or the external signal input unit and reproducing video and audio onscreen and to a speaker; and a control unit for sequentially storing setting data for setting environments of the tuner, the external signal input unit, and the signal processing unit according to an externally applied control signal, and setting environments of the tuner, the external signal input unit, and the signal processing unit with previous or subsequent state setting data based on any one of the sequentially stored data in response to a state changing signal applied from an external source.

Preferably, the signal processing unit includes a signal separator for selecting a broadcast signal or an external signal from the external signal input unit or the tuner into a video signal and an audio signal; a video signal processing unit for processing and outputting to the screen the video signal of the signal separator; and an audio signal processing unit for processing and outputting to the speaker the audio signal of the signal separator.

Preferably, the control unit includes a micro controller for inputting and interpreting a control signal and a state changing signal from an external source, and controlling the external signal input unit and the signal processing unit; and a state setting unit for storing setting data outputted from the micro controller, and outputting previous or subsequent setting data of the stored setting data to the tuner, the external signal input unit, and the signal processing unit in response to the state changing signal.

Preferably, the state setting unit includes an address generator for generating a certain address in response to the state changing signal; a parallel shift register for outputting already stored setting data to the tuner, the external signal input unit, and the signal processing unit, based on the address of the address block provided by the address generator; and a register output detector for decreasing the address generated from the address generator by one address block upon detecting shift operations of the parallel shift register.

Preferably, the state changing signal includes a first state changing signal for re-setting the video displayer to previous setting data of a reference setting data; and a second state changing signal for re-setting the video displayer to subsequent setting data of the reference setting data.

Preferably, the parallel shift register is a shift register having a First in First Out (FIFO) parallel structure for outputting setting data corresponding to an address.

Preferably, the address generator includes an address register for storing an address of most recently stored setting data to the parallel shift register; and an adder/subtractor for increasing or decreasing addresses stored in the address register in response to a state changing signal outputted from the micro controller.

Preferably, the register output detector detects whether there exists discarded setting data due to a shift operation of the parallel shift register and decreases an address outputted from the adder/subtractor by one address block.

The above objects are achieved, according to the present invention, by a remote control unit having a control key for controlling the video displayer; and at least two state changing keys for generating the state changing signal, in a video displayer having a tuner for selecting a broadcast signal; an external signal input unit for inputting an external signal; a signal processing unit for processing a broadcast signal or an external signal selected by the tuner or the external signal input unit and reproducing video and audio onscreen and to a speaker; and a control unit for sequentially storing setting data for setting environments of the tuner, the external signal input unit, and the signal processing unit according to an externally applied control signal, and setting environments of the tuner, the external signal input unit, and the seal processing unit with previous or subsequent state setting data based on any one of the sequentially stored data in response to a state changing signal applied from an external source.

Preferably, the state changing key includes a previous state selection key for selecting a previous state of states set in the video displayer; and a subsequent state selection key for selecting a subsequent state of the states set in the video displayer.

The above objects are achieved, according to the present invention, by a method for setting channels and external inputs in a video displayer, comprising steps of sequentially storing channels of the video displayer and setting data for setting images and sounds for the channels or external inputs whenever the channels and external inputs are switched; re-setting the video displayer as previous and subsequent setting data based on setting data for a channel to which the video displayer is tuned as reference setting data in response to a state changing signal from an external source; and re-setting the reset setting data as reference setting data.

Preferably, the step for sequentially storing setting data stored in the order for plural setting data to be inputted in the First In First Out (FIFO) type parallel register discarding the setting data in the input order, when the sequentially stored setting data exceeds a certain capacity.

Preferably, the state changing signal includes a first state changing signal for re-setting the video displayer, based on previous setting data of the reference setting data; and a second state changing signal for re-setting the video displayer based on subsequent setting data of the reference setting data.

BRIEF DESCRIPTION OF THE DRAWINGS

The above-discussed objects and other features of the present invention will become more apparent by describing in detail a preferred embodiment thereof with reference to the attached drawings, in which.

DETAILED DESCRIPTION OF EXEMPLARY EMBODIMENTS

Hereinafter, the present invention will be described in detail with reference to the accompanying drawings.

Figure 1:
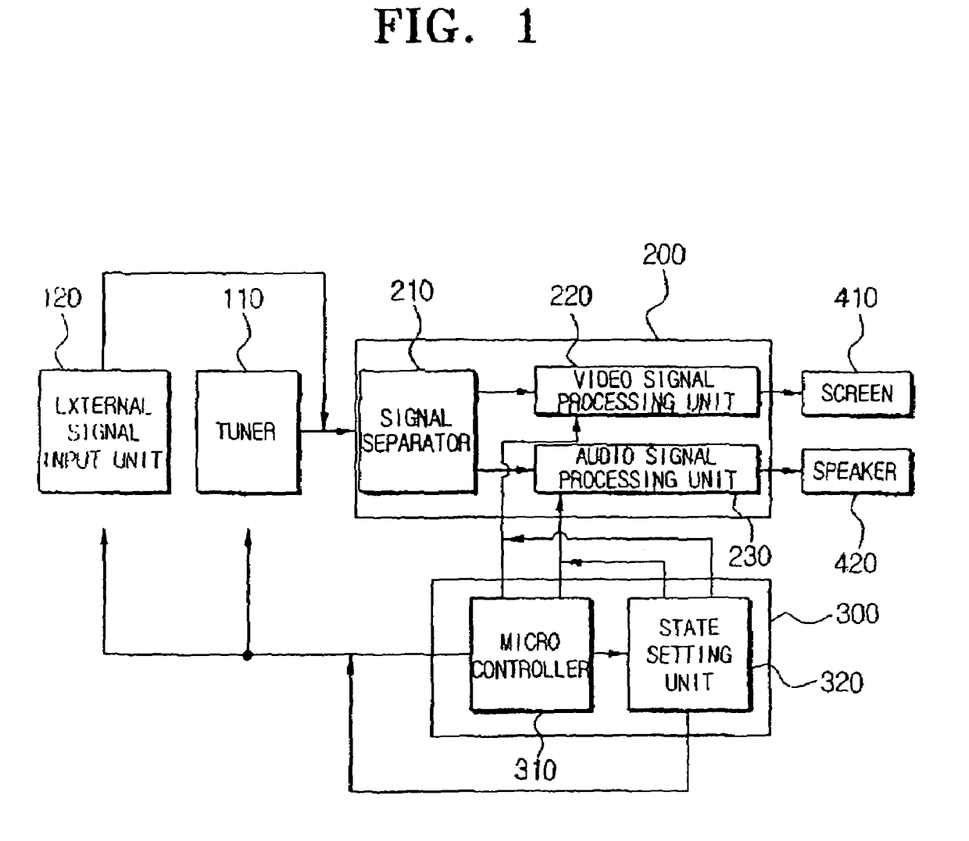
FIG. 1 is a block diagram schematically showing a video displayer facilitating channel settings according to a preferred embodiment of the present invention.

FIG. 1 is a block diagram for schematically showing a video displayer according to a preferred embodiment of the present invention.

The video displayer shown in FIG. 1 has a tuner 110, an external signal input unit 120, a signal processing unit 200, a control unit 300, a screen 410, and a speaker 420. The screen 410 may be a CRT screen, an LCD, DMD (digital micromirror device), or a plasma display, a front projection or rear projection apparatus, or any type of display device capable of producing a display of images suitable for use with the present invention.

The tuner 110 inputs and outputs a broadcast signal based on a channel set by a viewer. The output of the tuner 110 includes video and audio signals.

The external signal input unit 120 receives video and audio signals from a video device, a settop box, a DVD, digital medium player or other audio/video signal source or the like, which can be connected to the video displayer.

The signal processing unit 200 reproduces video and audio signals output from the tuner 110 and the external signal input unit 120 and outputs them to the screen 410 and the speaker 420.

The control unit 300 controls the tuner 110, external signal input unit 120, and the signal processing unit 200 based on a control signal outputted from a remote control unit (not shown) or a setting key (not shown) mounted on the video displayer, and sequentially stores each channel or external input selected by a viewer, a control signal for video setting to be set accordingly, a control signal for audio setting, and the other control signals (not shown). Therefore, the state changing keys (not shown) separately provided to a remote control unit enable previous or next channels to be selected based on a specific channel selection, and a control signal set for a selected channel controls the signal processing unit 200. Likewise, the same applies when one external input source is selected from at least two or more external input sources, for example, video, DVD, settop box, and so on, which are connected to a video displayer. As herein discussed, the control signal generally refers to signals controlling channel up and down, video and audio settings, and other control signals for a video displayer by the setting keys (not shown) provided to the remote control unit (not shown) or the video displayer. A remote control unit having state changing keys necessary to describe the operations of the video displayer will be described in detail later.

Preferably, the signal processing unit 200 has a signal separator 210, a video signal processing unit 220, and an audio signal processing unit 230.

The signal separator 210 separates a broadcast signal from the tuner 110 or the external signal input unit 120 into a video signal and an audio signal.

The video signal processing unit 220 processes and outputs to the screen 410 a video signal outputted from the signal separator 210. A video signal to be displayed on the screen 410 is adjusted in response to a control signal from the remote control unit (not shown), for example, control signals for brightness and contrast.

The audio signal processing unit 230 processes and outputs to the speaker 420 an audio signal outputted from the signal separator 210. The sound to be outputted to the speaker 420 is adjusted in response to a control signal from the remote control unit, for example, control signals for Dolby®, surround, 5.1-channel support, and multi-language support.

Preferably, the control unit 300 has a micro controller 310 and a state setting unit 320.

The micro controller 310 interprets control signals from setting keys attached to the remote control unit or the video displayer, and controls the tuner 110, external signal input unit 120, video signal processing unit 220, and audio signal processing unit 230 based on the interpreted signals. The micro controller 310 outputs a state changing signal to the state setting unit 320 upon receiving the state changing signal from a remote control unit or the setting keys.

The state setting unit 320 stores by channel or sequentially depending upon an externally inputted external input source, control signals applied to the tuner 110, external signal input unit 120, and the signal processing unit 200 from the micro controller 310, and sends any of setting data sequentially stored in response to a state changing signal from the micro controller 310 to the tuner 110, external signal input unit 120, video signal processing unit 220, and audio signal processing unit 230 and controls the tuner 110, external signal input unit 120, video signal processing unit 220, and audio signal processing unit 230. The state setting signal has a first state changing signal for selecting previously stored setting data based on a current setting state and a second state changing signal for selecting later stored setting data based on the current setting state.

Figure 2:
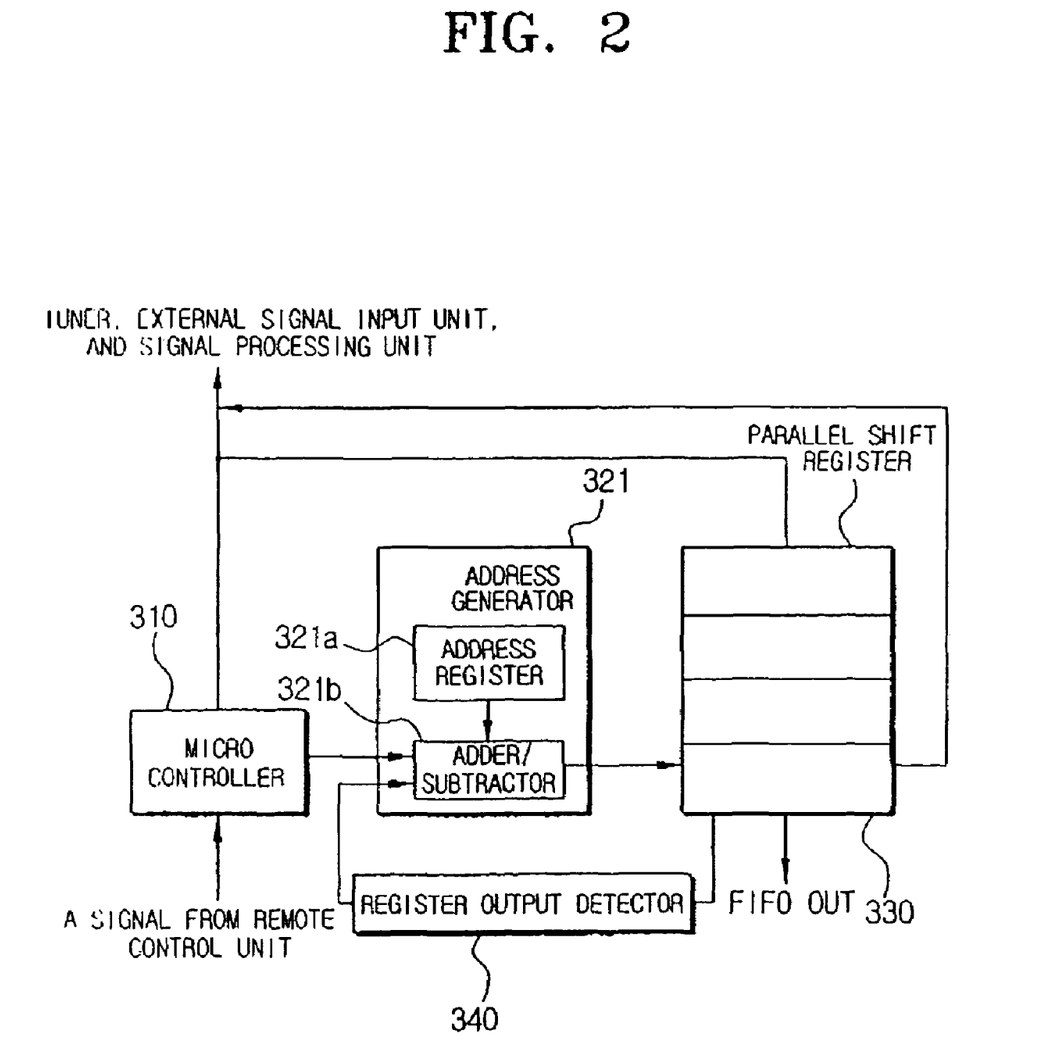
FIG. 2 is a block diagram showing in detail the operations of the state setting unit of FIG. 1.

FIG. 2 is a block diagram for showing the state setting unit 320 in detail.

The state setting unit 320 shown in FIG. 2 has an address generator 321, a parallel shift register 330, and a register output detector 340.

The parallel shift register 330 detects and sequentially stores setting data that the micro controller 310—responding to a control signal generated by a remote control unit (not shown) or a setting key—outputs to the tuner 110, the external signal input unit 120, and the signal processing unit 200.

The address generator 321 stores a channel selected from the remote control unit and the most recently executed setting data of the setting data for the channel. Accordingly, the address generator 321 generates addresses for a previous or subsequent channel and the setting data based on the already stored setting data in response to a state setting signal from the micro controller 310. Therefore, any of the setting data stored in the parallel shift register 330 is selected to control the tuner 110, external signal input unit 120, and signal processing unit 200.

The register output detector 340 detects whether or not discard setting data exists because of the shift operation of the parallel shift register of the FIFO (First In First Out) type, and feeds back the detection to the address generator 321. At this time, a signal outputted from the register output detector 340 is considered a first state changing signal, and the address generator 321 outputs an address decreased by one address block. For reference, when the storage capacity of the parallel shift register 330 is exceeded, the parallel shift register 330 discards setting data inputted first, and receives newly inputted setting data at the tail address block of the parallel shift register 330. Accordingly, in order for the address generator 321 to point to the setting data of a previous address block of the parallel shift register 330, the parallel shift register 330 should output setting data of an address decreased by one block.

Preferably, the address generator 321 has an address register 321a and an adder/subtractor 321b.

The address register 321a stores an address of setting data that the parallel shift register 330 outputs to the tuner 110, external signal input unit 120, and signal processing unit 200. That is, the address register 321a stores an address of the most recent setting data of the setting data controlling the tuner 110, external signal input unit 120, and signal processing unit 200. At this time, a state changing signal is a signal to be generated by a state changing key separately provided on the remote control unit or a setting key separately provided on the video displayer such as a TV set.

The adder/subtractor 321b decreases an address stored in the address register 321a by one address block when inputting the first state changing signal from the micro controller 310 based on an address stored in the address register 321a, and increases an address stored in the address register 321a by one address block when inputting the second state changing signal. Accordingly, the setting data stored in the previous step can be called based on the address stored in the address register 321a. In this way, upon controlling the tuner 110, external signal input unit 120, and signal processing unit 200 by calling the setting data stored in the previous step, the address of the called setting data is stored in the address register 321a, based on which the setting data of the previous or later step can be called.

Figure 3:
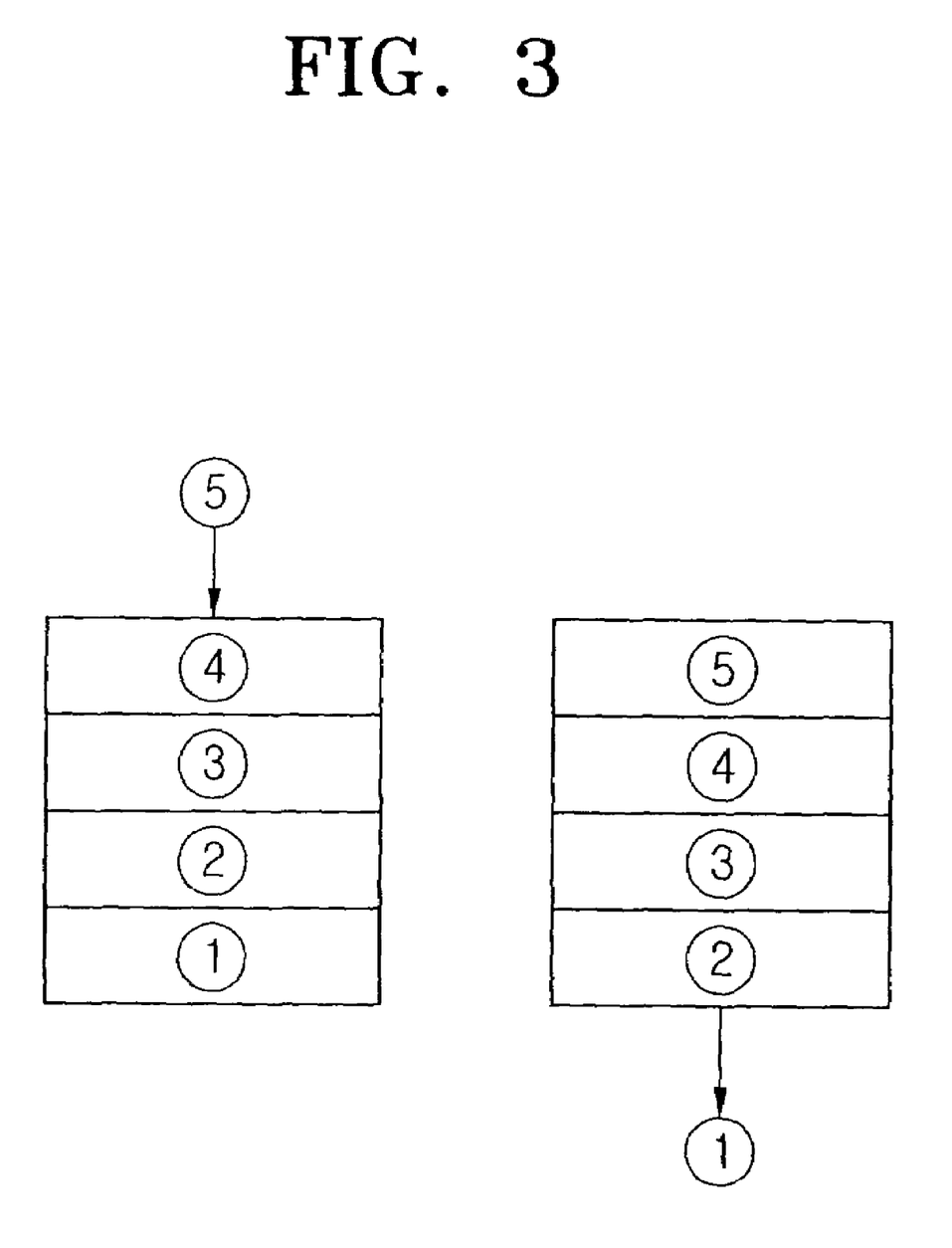
FIG. 3 is a view explaining the operations of a parallel shift register.

FIG. 3 is a view for explaining the operations of the parallel shift register.

Whereas a general shift register has a structure that firstly stored data comes out first for an output by the FIFO operation, the parallel shift register 330 performs the same operation as the general shift register, but it can output data selected by addressing even though the data is not first stored through external addressing. The reason that a preferred embodiment of the present video displayer uses a parallel shift register is that a shift register is needed primarily for storing new setting data while discarding previous setting data when storing setting data in a limited storage space (memory space), and is for controlling the tuner 110, external signal input unit 120, and signal processing unit 200 with setting data stored on a previous or a subsequent address based on the setting data stored on an arbitrary address as reference data.

As shown in FIG. 3, when setting data 5 is input into a shift register, thus reaches storage space limit, firstly stored setting data 1 is discarded. The number of data blocks of the parallel shift register 330 is shown as four in this example, but the number of blocks may greater or fewer.

Figure 4:
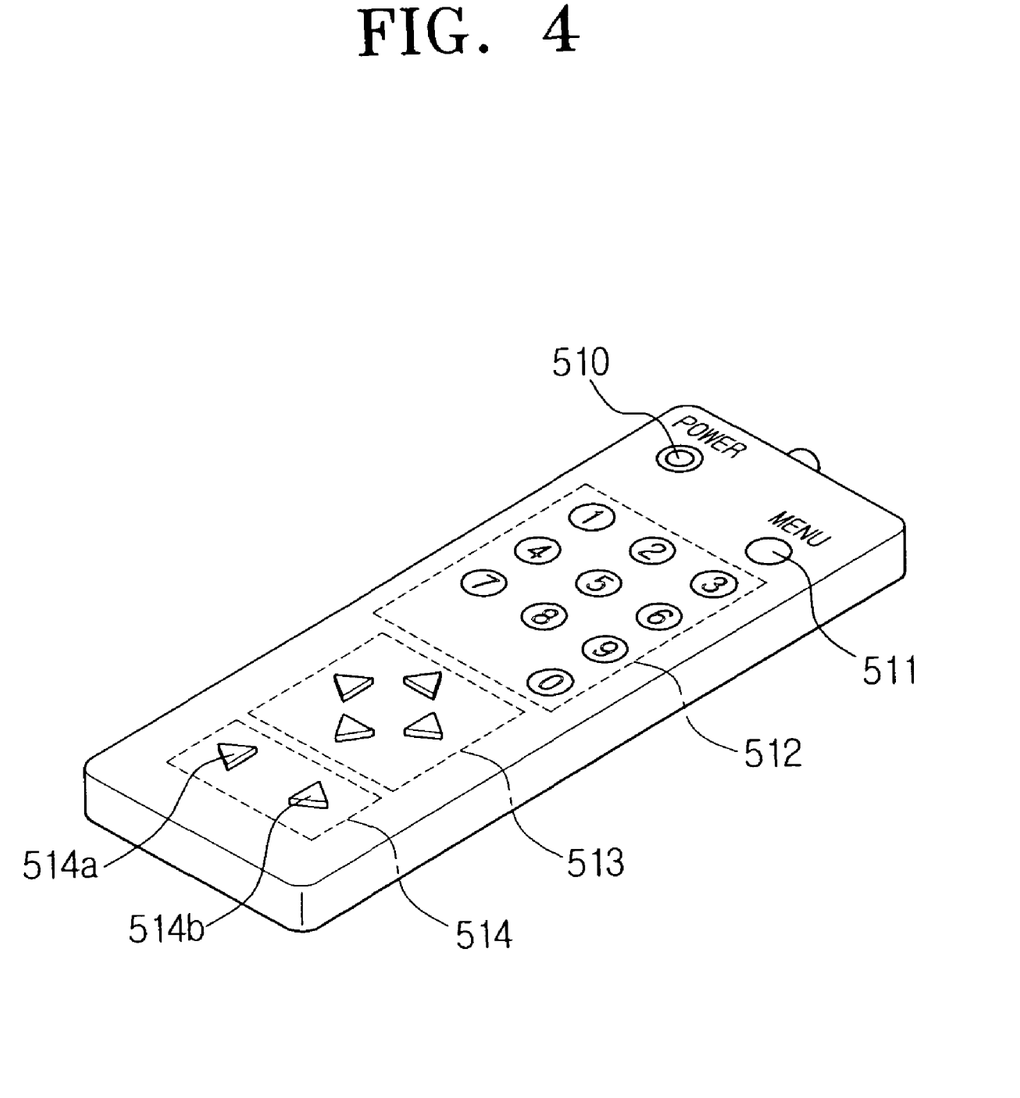
FIG. 4 is a perspective view showing a remote control unit for a video displayer facilitating channel settings according to a preferred embodiment of the present invention.

FIG. 4 is a perspective view for showing a remote control unit for a video displayer facilitating channel settings according to a preferred embodiment of the resent invention.

The remote control unit shown in FIG. 4 has control keys 510 to 513 for video, audio, and channel settings of the video displayer and a state changing key 514.

The control keys 510 to 513 are general control keys for controlling the video displayer, including a power key 510 for turning on and off electric power, a numeric key 512 for setting channels, and a selection key 513 for selecting menus displayed on the screen when an OSD menu based on a Graphic User Interface (GUI) function is displayed on the screen 410 (screen 410 is schematically shown in FIG. 1).

The state changing key 514 has the first state changing key 514a for selecting a previous state and the second state changing key 514b for selecting a subsequent state. The subsequent state is a more recently selected state during the use of the remote control unit. For example, when a viewer selects the first state changing key 514a after the viewer selected channel 6, channel 7, channel 9, and channel 11 in turn through the remote control unit for TV watching, the channels are set from channel 11 to channel 6. Based on this state, if the first state changing key 514a is pressed, channel 7 is selected, and, if the second state changing key 514b is pressed, channel 11 is selected. That is, the previous or subsequent state can be selected based on the more recently selected channel 9. Likewise, when plural external input sources such as video device, DVD, and settop box are coupled to the video displayer, if a viewer selected the video, DVD, and settop box in turn for watching, the viewer can select each of the three illustrative external input sources through the state changing key 514 of the remote control unit. A key code value different from an existing control key is provided to the state changing key 514, and the video displayer using such a remote control unit interprets the key code value of the state changing key 514 and sets channels, video, and audio.

Figure 5:
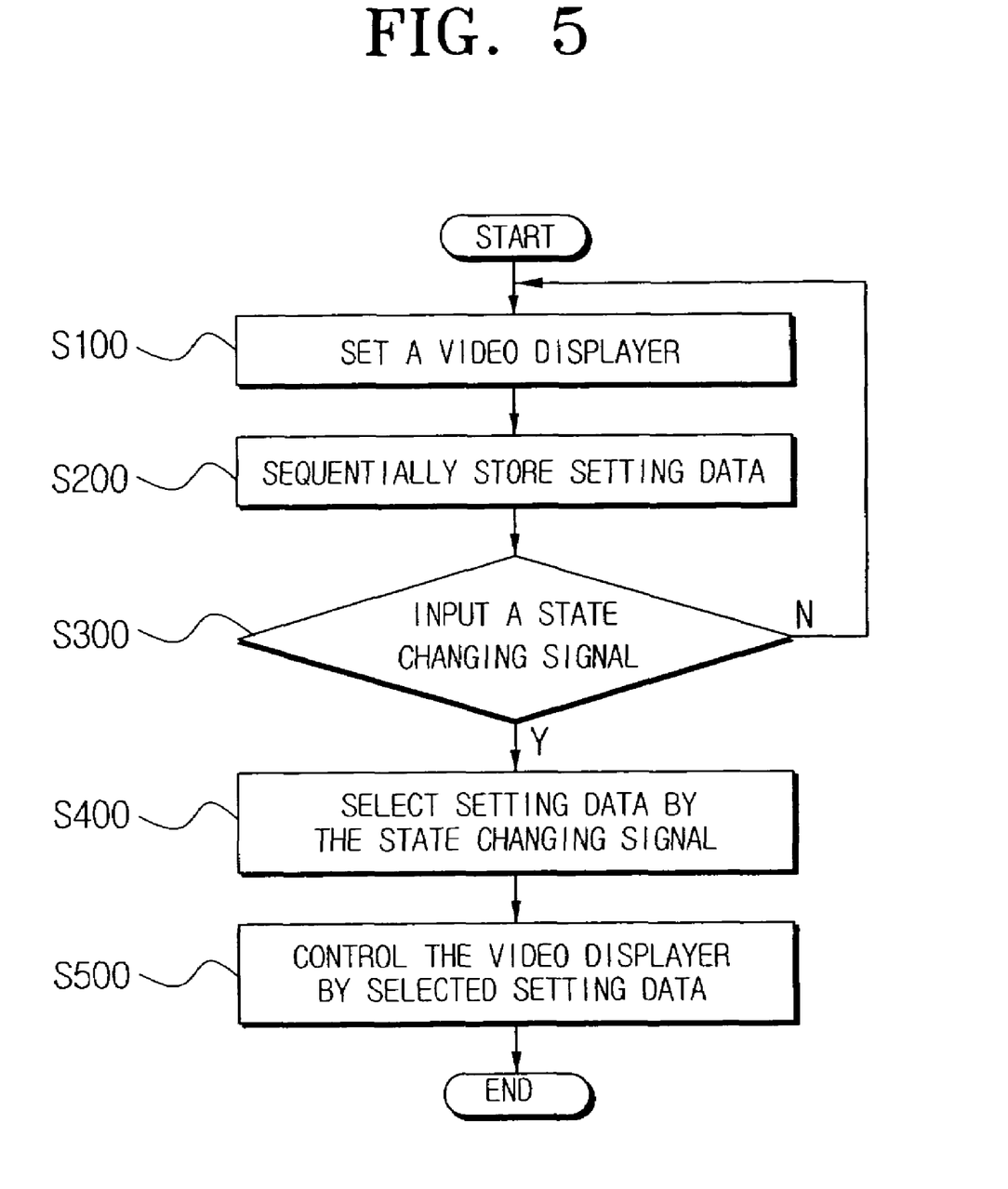
FIG. 5 is a flow chart showing a channel setting process according to a preferred embodiment of the present invention.

FIG. 5 is a flow chart for showing a channel setting process according to a preferred embodiment of the present invention.

First, a viewer selects a certain channel and sets video and audio states for the selected channel (S100). Next, when the viewer selects a different channel other than the selected channel and sets video and audio states for the selected channel, the respective channels and setting data for the respective channels are sequentially stored in the parallel shift register 330 (S200). The parallel shift register 330 stores the data in the FIFO scheme such that firstly inputted data comes out first. At this time, a channel through which the viewer watches a program and the setting data set for the channel become the reference setting data. Next, in response to a state changing signal (S300) generated by a setting key and provided to the remote control unit or the video displayer, such as a TV set, the state setting unit 320 selects the previous or subsequent setting data based on the reference setting data (S400), and sets the tuner 110 and the signal processing unit 200 according to the selected setting data (S500). At this time, if the first state changing signal is applied from the micro controller 310, the state setting unit 320 sets the tuner 110 and the signal processing unit 200 according to the setting data stored in the previous step based on the reference setting data, and, if the second state changing signal is applied from the micro controller 310, the state setting unit 320 sets the tuner 110 and the signal processing unit 200 according to the setting data stored in the subsequent step based on the reference setting data. Accordingly, when the setting data stored in a step prior to a certain step is selected from the reference setting data, a certain channel is displayed on the screen 410, and the signal processing unit 200 is reset based on the video and audio setting data set for the channel. At this time, the channel displayed on the screen 410 and the setting data set for the channel become new reference setting data. The setting data stored in the previous and subsequent steps based on such new reference setting data can be selected by the first state changing key 514a and the second state changing key 514b. Likewise, even when an external input signal such as DVD, video, or the like is inputted, the setting data set for each external input signal can be selected by the above process. Thus, a viewer can control the signal processing unit 200 with a previous channel or external input through which the viewer watched a program and the setting data that is set for the channel or external input merely by manipulating the first and second state changing keys 514a and 514b provided to the remote control unit.

As stated above, in the present invention, a viewer revives the previous channel and the setting data set for the channel by simple key manipulations. The video and audio settings are automatically reset by the revived setting data, so that there is no need for the viewer to readjust settings, for example on a separate OSD menu using the remote control unit or the setting key, when intending to watch a program through the previous channel.

Further, for the remote control unit according to the present invention, only two keys, i.e., the first state changing key and the second state changing key are provided to the existing remote control unit so that the video displayer can be readily controlled.

Although the preferred embodiment of the present invention has been described, it will be understood by those skilled in the art that the present invention is not limited to the described preferred embodiment. Various changes and modifications can be made within the spirit and scope of the present invention as defined by the appended claims.

What is claimed is:

1. A video displayer that facilitates resetting of channel and external input settings, the video displayer comprising:
   a tuner configured to select a broadcast signal;
   an external signal input unit configured to receive an external signal;
   a signal processing unit configured to process one of the broadcast signal selected and the external signal, and to reproduce video images on a display and audio output through a speaker; and
   a control unit configured to sequentially store setting data for setting environments of said tuner, said external signal input unit, and said signal processing unit according to an externally applied control signal, and to set the setting environment of at least one of said tuner, said external signal input unit, and said signal processing unit with one of previous setting data and subsequent setting data based on any one data set of the sequentially stored setting data in response to a state changing signal applied from an external source;
   wherein the state changing signal comprises:
   a first state changing signal configured to reset the video displayer according to previous setting data of the stored data; and
   a second state changing signal configured to reset the video displayer according to subsequent setting data of the stored setting data.

2. The video displayer as claimed in claim 1, said signal processing unit comprising:
   a signal separator configured to separate one of the broadcast signal selected and the external signal into a video signal and an audio signal;
   a video signal processing unit configured to process and output to the display the video signal of said signal separator; and
   an audio signal processing unit configured to process and output to the speaker the audio signal of said signal separator.

3. The video displayer as claimed in claim 1, said control unit comprising:
   a micro controller configured to receive and interpret the control signal and the state changing signal, and to control at least one of said tuner, said external signal input unit, and said signal processing unit; and
   a state setting unit configured to store setting data output from said micro controller, and to output, in response to the state changing signal, one of previous setting data of the stored setting data and subsequent setting data of the stored setting data to at least one of said tuner, said external signal input unit, and said signal processing unit.

4. The video displayer as claimed in claim 3, said state setting unit comprising:
   an address generator configured to generate an address in response to the state changing signal;
   a parallel shift register configured to output stored setting data to at least one of said tuner, said external signal input unit, and said signal processing unit, based on the address generated by said address generator; and
   a register output detector configured to decrease the address generated by said address generator by one address block upon detecting a shift operation of the parallel shift register.

5. The video displayer as claimed in claim 4, wherein the parallel shift register is a First In First Out (FIFO) parallel shift register configured to output setting data corresponding to a respective address block.

6. The video displayer as claimed in claim 5, said address generator comprising:
   an address register configured to store an address of selling data most recently stored to said parallel shift register; and
   an adder/subtractor configured to one of increase and decrease an address stored in said address register in response to the state changing signal.

7. The video displayer of claim 4, wherein the address generator comprises:
   an address register configured to store an address of setting data most recently stored to the parallel shift register; and
   an adder/subtractor configured to one of increase and decrease an address stored in the address register in response to the state changing signal.

8. The video displayer as claimed in claim 6, wherein said register output detector is configured to detect whether setting data is discarded resulting from a shift operation of said FIFO parallel shift register and, upon detecting discarding of the setting data, to decrease the address generated by said address generator by one address block.

9. The video displayer of claim 5, wherein the register output detector is configured to detect whether setting data is discarded resulting from a shift operation of the FIFO parallel shift register and, upon detecting discarding of the setting data, to decrease the address generated by the address generator by one address block.

10. A video displayer having a tuner configured to select a broadcast signal; an external signal input unit configured to receive an external signal; a signal processing unit configured to process one of the broadcast signal selected and the external signal and to reproduce a video signal on a display and an audio signal to a speaker; and a control unit configured to store sequentially setting data for selling environments of said tuner, said external signal input unit, and said signal processing unit, and to set, according to an externally applied state changing signal, a selling environment of at least one of said tuner, said external signal input unit, and said signal processing unit with one of previous setting data and subsequent setting data, based on any one of the sequentially stored setting data, the video displayer comprising:
    a control key configured to control said video displayer; and
    at least two state changing keys configured to generate the state changing signal;
    wherein the state changing signal comprises:
    a first state changing signal configured to reset the video displayer according to previous setting data of the stored setting data; and
    a second state changing signal configured to reset the video displayer according to subsequent setting data of the stored setting data.

11. The video displayer as claimed in claim 10, said state changing keys comprising:
    a previous state selection key configured to select a previous setting state based on the setting data stored in said video displayer; and
    a subsequent state selection key configured to select a subsequent setting state based on the setting data stored in said video displayer.

12. A method of resetting setting information for broadcast channels and external data inputs in a video displayer, comprising:
    sequentially storing the broadcast channels of the video displayer and setting data for images and sounds for the broadcast channels or the external inputs, whenever one of the broadcast channels or the external inputs is switched;
    resetting the video displayer according to one of previous setting data and subsequent setting data, based on setting data for a broadcast channel to which the video displayer is tuned as reference setting data in response to a state changing signal from an external source; and
    resetting the reset setting data as reference setting data;
    wherein the state changing signal comprises:
    a first state changing signal configured to reset the video displayer according to previous setting data of the stored setting data; and
    a second state changing signal configured to reset the video displayer according to subsequent setting data of the stored setting data.

13. The method as claimed in claim 12, wherein in the sequentially storing, the setting data is stored in a First In First Out (FIFO) parallel shift register configured to discard the setting data, in an order of input, when the setting data exceeds a capacity of the FIFO parallel shift register.

14. The method as claimed in claim 12, the state changing signal comprising:
    a first state changing signal configured to—reset the video displayer based on previous setting data with respect to the reference setting data; and
    a second state changing signal configured to—reset the video displayer based on subsequent setting data with respect to the reference setting data.

15. A method of resetting setting information for broadcast channels and external data inputs in a video displayer, comprising:
    sequentially storing, in a register of the video displayer, the broadcast channels of the video displayer and setting data for images and sounds for the broadcast channels or the external inputs, whenever one of the broadcast channels or the external inputs is switched;
    resetting the video displayer according to one of previous setting data and subsequent setting data, based on setting data for a broadcast channel to which the video displayer is tuned as reference setting data in response to a state changing signal from an external source; and
    resetting the reset setting data as reference setting data;
    wherein the state changing signal comprises:
    a first state changing signal configured to reset the video displayer according to previous setting data of the stored setting data; and
    a second state changing signal configured to reset the video displayer according to subsequent setting data of the stored setting data.

16. The method of claim 15, wherein in the sequentially storing, the setting data is stored in a First In First Out (FIFO) parallel shift register configured to discard the setting data, in an order of input, when the setting data exceeds a capacity of the FIFO parallel shift register.

17. The method of claim 15, wherein the state changing signal comprises:
 a first state changing signal configured to reset the video displayer based on previous setting data with respect to the reference setting data; and
 a second state changing signal configured to reset the video displayer based on subsequent setting data with respect to the reference setting data.

18. A video displayer facilitating channel or external input settings, comprising:
 a tuner for selecting a broadcast signal;
 an external signal input unit for receiving an external signal;
 a signal processing unit for processing the broadcast signal or an external signal selected by the tuner or the external signal input unit and reproducing video and audio on a screen and to a speaker; and
 a control unit configured to store setting data for setting a presentation environment of the broadcast signal on a channel by channel basis or for setting presentation environment of the external signal depending upon the type of the external signal and configured to change the channel or the type of external source being viewed by the user; wherein upon a return to a previous channel or an external signal, the setting data applicable before the change is re-applied.

* * * * *